Hill & Hammond,
Corn Planter,
Nº 79,120. Patented June 23, 1868.
Fig. 1.
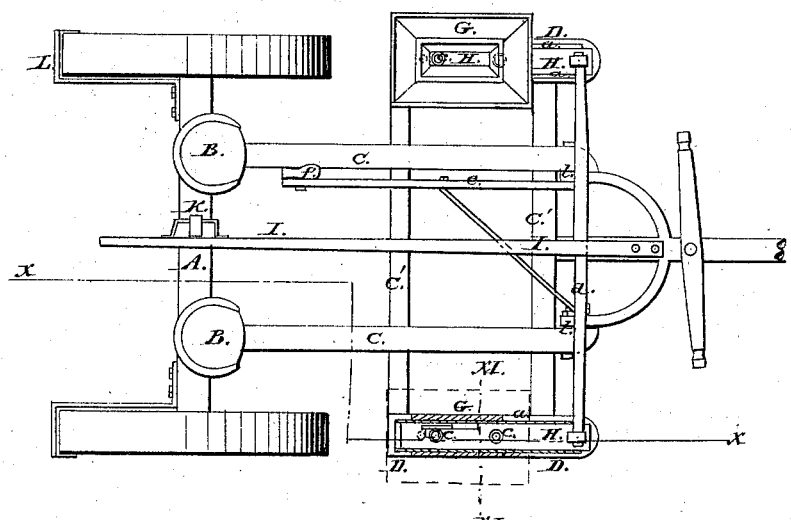
Fig. 3.
Fig. 2.
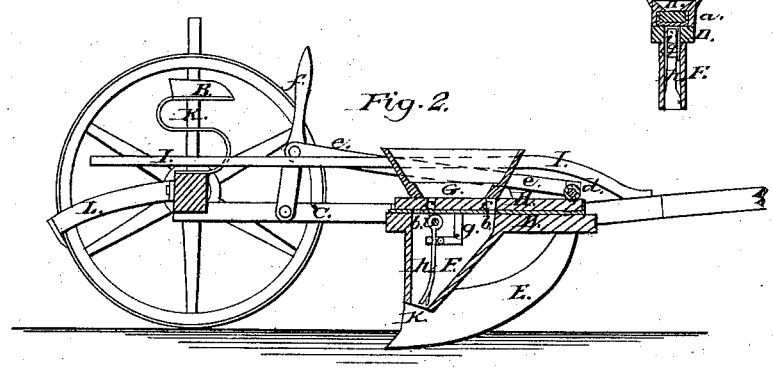
Witnesses:
Charles H. Orren
F. C. Somes
Inventors:
Justin H. Hill &
John S. Hammond
by
D. E. Somes & Co. Attorneys

United States Patent Office.

JUSTIN H. HILL AND JOHN T. HAMMOND, OF CLINTON, ILLINOIS.

Letters Patent No. 79,120, dated June 23, 1868.

IMPROVEMENT IN CORN-PLANTER.

*The Schedule referred to in these Letters Patent and making part of the same.*

TO ALL WHOM IT MAY CONCERN:

Be it known that we, JUSTIN H. HILL and JOHN T. HAMMOND, of Clinton, in the county of De Witt, and State of Illinois, have invented new and useful Improvements in Corn-Planters; and we do hereby declare that the following is a full, clear, and exact description thereof, reference being had to the annexed drawings making part of this specification, in which—

Figure 1 is a plan or top view, with a portion removed.
Figure 2 is a section on the line X X of fig. 1, and
Figure 3 is a cross-section on the line XI XI, same figure.

The nature of our invention is such that the seed, before being finally deposited in the furrow made to receive it, is brought to rest at a point above and near the surface of the ground, so that in the short distance it has at last to fall, it will not be scattered and spread about, as it would be if allowed to descend through the whole length of the conveying-chute or tube and out of it.

In the drawing, A is the axle of our corn-planter, on which are supported the seats B B for the driver and operator. C C' is a frame connected with the axle, and supporting at the ends of the cross-ties C' the bed-pieces D D, immediately in front of the wheels, which are made with broad treads to crush down and cover the furrows made by the plows or shovels E. These are attached by their standards to the front ends of the bed-pieces D, and are so set as to cut a furrow immediately in the track of the wheels, and are divided at their rear ends into two diverging wings, that they may widen the furrow made by their front cutting-edges.

Each bed-piece D has a longitudinal opening through its centre for a portion of its length, communicating with the chute F, which has its terminal opening between the wings of the plow or shovel E. On the bed-piece D is secured a plate, $a$, having two holes $b$ $b$, for the passage of the seed into the chute, which holes are near the ends of the longitudinal opening through the bed-piece D. The seed-box or hopper G is attached to the upper side of the bed-piece D, and its bottom is raised sufficiently above the top surface of the plate $a$ to permit the sliding gate H to traverse freely backwards and forwards under it and on the plate $a$, the sides of which are turned up, as seen in fig. 3, to serve as guides for the gate, which in itself constitutes the bottom of the seed-box or hopper. The gate H has two holes $c$ $c$ through it, nearer together than the holes through the plate $a$, so that only one pair of holes, $b$ $c$, may be together at a time, and the holes $b$ are so placed, that when the holes $c$ are over them, no communication will exist between them and the seed-box or hopper. The gates H are connected by a bar, $d$, from which a connecting-rod, $e$, extends to a lever, $f$, jointed to one of the beams C of the frame, and within reach of the operator, who moves the gates by vibrating the lever at the proper time. To the under side of each gate H, is attached an arm, $g$, which descends through a slot in the plate $a$ into the chute F, and carries two pins, between which is embraced a flexible and elastic blade or tongue, $h$. This tongue is hung upon a joint-pin at $i$, figs. 2 and 3, and is wide enough below the pins on the arm $g$ to fill up the whole interior width of the chute F, and still be able to vibrate within it without friction against the sides. The lower end of the tongue $h$, which is near the mouth of the chute, is forked or double, as seen at $k$, fig. 2. When the gate H is moved so that seed may be dropped into the chute F, the tongue $h$ is also moved so that one limb of its forked end shall close the chute on one side, and prevent the seed from falling out, until seed is dropped by another movement of the gate on the other side of the tongue, when that seed which first fell into the chute is released and drops into the furrow made for it, and the seed last fed by the gate is held as the first was, until it in turn shall be dropped into the furrow, which is done without being separated or scattered.

A lever, I, is firmly attached to the pole of the implement, which pole is jointed to the front ends of the beams C at $l$. This lever I extends rearwards, so as to be under the control of the driver. A post, K, is erected on the axle A, having latch-notches, by which the rear end of the lever I may be sustained at any altitude. When it is desired to lift the plows clear of the ground, it is effected by raising the rear end of the lever I, when the frame C C' will be lifted at the joints $l$, and the weight of the implement will be supported on the wheels and the backs of the animals hauling it.

L L are scrapers, for the purpose of clearing the wheels from the soil that may adhere to them as they roll.

Having thus fully described our invention, what we claim as new, and desire to secure by Letters Patent, is—

The combination and arrangement of the slides H H and plates *a a*, with the tongue *h*, chute F, and plow E, as set forth.

In testimony that we claim the above-described improvements in corn-planters, we have hereunto signed our names, this 20th day of January, 1868.

JUSTIN H. HILL,
JOHN T. HAMMOND.

Witnesses:
  SOLOMON F. LEWIS,
  CHAS. H. DENNETT.